(12) United States Patent
Hodgson

(10) Patent No.: US 8,028,442 B2
(45) Date of Patent: Oct. 4, 2011

(54) ATHLETICS SHOE

(75) Inventor: James Mathew Hodgson, Bristol (GB)

(73) Assignee: NIKE, Inc., Beaverton, OR (US)

( * ) Notice: Subject to any disclaimer, the term of this patent is extended or adjusted under 35 U.S.C. 154(b) by 947 days.

(21) Appl. No.: 10/562,963

(22) PCT Filed: Jun. 30, 2004

(86) PCT No.: PCT/EP2004/007196
§ 371 (c)(1), (2), (4) Date: Nov. 20, 2006

(87) PCT Pub. No.: WO2005/004656
PCT Pub. Date: Jan. 20, 2005

(65) Prior Publication Data
US 2007/0107267 A1    May 17, 2007

(30) Foreign Application Priority Data
Jul. 1, 2003 (GB) .................................. 0315277.4

(51) Int. Cl.
A43B 13/00 (2006.01)
A43B 3/12 (2006.01)
A43B 5/00 (2006.01)
A63B 71/12 (2006.01)

(52) U.S. Cl. ................. 36/103; 36/129; 36/11.5; 36/106

(58) Field of Classification Search ................. 36/7.1 R, 36/7.4, 7.7, 88, 93, 102, 106, 114, 129, 11.5, 36/103, 31, 8.1, 8.3, 127
See application file for complete search history.

(56) References Cited

U.S. PATENT DOCUMENTS

| | | | | |
|---|---|---|---|---|
| 3,290,801 | A | * | 12/1966 | Bente ................................ 36/92 |
| 3,605,292 | A | * | 9/1971 | Goldblatt ......................... 36/8.1 |
| 3,640,006 | A | * | 2/1972 | Kendrick ......................... 36/8.1 |
| 4,177,582 | A | * | 12/1979 | Ehrlich, Jr. ........................ 36/33 |
| 4,525,940 | A | * | 7/1985 | Mochizuki ...................... 36/8.1 |
| RE32,394 | E | * | 4/1987 | Ehrlich ............................. 36/33 |
| 4,779,361 | A | * | 10/1988 | Kinsaul ............................ 36/102 |
| 5,370,604 | A | * | 12/1994 | Bernardoni ..................... 602/27 |
| 5,406,723 | A | | 4/1995 | Okajima |
| 5,423,134 | A | * | 6/1995 | Bagnaia et al. ................ 36/11.5 |

(Continued)

FOREIGN PATENT DOCUMENTS

DE    202 08 561    10/2002

(Continued)

OTHER PUBLICATIONS

Office Action in corresponding Japanese Application No. 2006-518093 issued on Jan. 6, 2010.

(Continued)

*Primary Examiner* — Jila Mohandesi
*Assistant Examiner* — Melissa Lalli

(57) ABSTRACT

The application relates to a sole (20) for footwear (10) which has a toe part (70) being made of a substantially inflexible material, a ball part (80) being made of a flexible material, and an instep-heel part (90) being made of a substantially inflexible material. In the preferred embodiment of the invention, the substantially inflexible material is carbon fiber in a thermoplastic epoxy resin and the flexible material of an aramide fiber in a thermoplastic epoxy resin. The application also teaches a shoe made with this sole and a method for the manufacture of the shoe.

22 Claims, 5 Drawing Sheets

U.S. PATENT DOCUMENTS

| | | | |
|---|---|---|---|
| 5,483,760 A | 1/1996 | Kataoka et al. | |
| 5,752,332 A * | 5/1998 | Kataoka et al. | 36/134 |
| 5,836,094 A | 11/1998 | Figel | |
| 5,915,820 A | 6/1999 | Kraeuter et al. | |
| 6,122,845 A * | 9/2000 | Menghi | 36/50.1 |
| 6,421,933 B1 * | 7/2002 | Zamprogno | 36/43 |
| 6,467,196 B1 | 10/2002 | Koyama | |
| 6,490,814 B2 * | 12/2002 | Matis | 36/11.5 |
| 6,502,330 B1 | 1/2003 | David et al. | |
| 6,505,424 B2 * | 1/2003 | Oorei et al. | 36/129 |
| 6,854,200 B2 * | 2/2005 | Hipp et al. | 36/96 |
| 6,889,452 B2 * | 5/2005 | Ailey et al. | 36/44 |
| 7,121,020 B1 * | 10/2006 | Bathum | 36/102 |
| 2002/0017038 A1 | 2/2002 | Umezawa | |
| 2002/0124433 A1 * | 9/2002 | Pan | 36/11.5 |
| 2004/0154192 A1 * | 8/2004 | Bengtsson et al. | 36/30 R |

FOREIGN PATENT DOCUMENTS

| | | |
|---|---|---|
| EP | 0724952 | 8/1996 |
| EP | 0799583 | 10/1997 |
| EP | 1234516 | 8/2002 |
| EP | 1234516 A2 | 8/2002 |
| JP | S55-52702 A | 4/1980 |
| JP | H07-000209 A | 1/1995 |
| JP | 2000-041702 A | 2/2000 |
| JP | 2001-314203 A | 11/2001 |
| JP | 2002-248006 A | 9/2002 |
| JP | 2003-500141 A | 1/2003 |
| WO | WO00/07477 A | 2/2000 |

OTHER PUBLICATIONS

Office Action issued in corresponding European Patent Office Application, Application No. 04740557.6, issued Jul. 27, 2006.

Office Action issued in corresponding European Patent Office Application, Application No. 04740557.6, issued Dec. 13, 2007.

Notice of Rejection issued in corresponding Japanese application, Application No. 2006-58093, on Feb. 23, 2011.

* cited by examiner

ATHLETICS SHOE

This application is a U.S. National Stage application of co-pending PCT Application Number PCT/EP2004/007196, entitled "Athletics Shoe" and filed Jun. 30, 2004, which claims priority to Great Britain Patent Application Number GB0315277.4, entitled "Athletics Shoe" and filed Jul. 1, 2003. These applications are incorporated herein by reference in there entireties.

FIELD OF THE INVENTION

The invention relates to footwear and, more particularly, to athletics footwear for track events.

BACKGROUND TO THE INVENTION

Current sports shoes for athletes have a plastic sole and textile upper. Such shoes are manufactured to be as light as possible in order to improve the performance of the athletes, particularly over short distances, e.g. 100 m or 200 m.

One example of a sports shoe is known from European Patent Application No. EP-A-0 799 583 (Technica S.p.A). The shoes described in this patent have a sole made from a resilient material such as rubber with a strengthening insert. This shoe is not suitable for short distance track events because of its weight.

A variety of athletics shoes are produced by several manufacturers. The Saucony middle distance race shoe has a very light-weight fabric to keep the total weight of the shoe as low as possible. An Asics sprinting spike shoe uses a rubber grip on the sole of the shoe from the footplate backwards.

Sandals are also known in the art which can be used for trail running and hiking. These sandals, such as those manufactured by the Teva Company, Flagstaff, Ariz., United States, have an open structure with straps to hold the sandals on the foot. The sandals have a substantially flat sole with an open toe, arch and heel areas. Whilst such sandals, such as the Wraptor 2 model, may be suitable for long-distance trail running their heavy weight makes them unsuitable for use by track athletes.

Cycling shoes are known in the art which are designed to be as light as possible and also to allow as much transmission of the athlete's muscular power to the cycle. For example, U.S. Pat. No. 5,836,094 (Figel) teaches a cycling shoe in which a composite made of fibre and resin replaces the sole and part of the upper of a traditional shoe. In this patent, the complete sole of the shoe is made from the composite. Manufacture of the composite is from carbon fibre, Kevlar fibres and epoxy resin which are built up using layers of carbon fibre sheets and Kevlar layers.

Another cycling shoe is described in U.S. Pat. No. 5,406,723 (Okajima, assigned to Shimano, Inc., Osaka, Japan). This patent describes a sole of a shoe with a fibrous layer surrounding a core made of polyurethane foam. A glass cloth is applied to the upper and lower surfaces of the core to form a layer. A carbon fibre sheet impregnated with phenol resin is then placed over the glass cloth followed by an impregnated glass cloth. This process is completed until a stiff sole is manufactured.

Cycling shoes are, however, not suitable for use by track athletes because they have a stiff sole which is substantially inflexible. Track athletes require a shoe which is flexible in order to maximise their performance, particularly at the starting blocks.

SUMMARY OF THE INVENTION

There is therefore a need to produce an improved shoe, particularly for use in short distance track events.

There is furthermore a need to reduce the weight of the shoe.

There is in addition a need to design a shoe for the maximum transmission of a track athlete's power to the track, particularly at the starting blocks.

These and other objects are achieved by providing a sole for footwear having a toe part, a ball part and an instep-heel part. The toe part of the sole is the area of the sole substantially adjacent to the athlete's foot. The ball part of the sole is the area of the footwear substantially adjacent to the ball of the athlete's foot. The instep-ball part of the sole is the remainder of the area of the sole and covers the arch or instep and ball parts of the athlete's foot. In the inventive sole, both the toe part and the instep-heel part of the sole are made of a substantially inflexible material. This material remains stiff whilst the athlete is running. On the other hand, the ball part of the sole is made of a flexible material which can bend when the athlete is at the starting blocks and during the race. This flexible material allows the athlete to flex the shoe at the natural position of flex of the foot (i.e. at the ball of the foot) and thus achieve maximum transfer of power at the start and during the race.

The substantially inflexible material is preferably a composite material of carbon fibre in a thermoplastic resin. This material is very strong and lightweight. The flexible material is preferably a composite material of carbon fibre in a thermoplastic resin. This material is also strong and lightweight, and furthermore resilient.

The shoe according to the invention has a substantially better strength to weight ratio compared to shoes made with conventional textile fabric. Furthermore stretching or movement of material is substantially elminated due to the non-elongation properties of the composite materials.

The objects of the invention are additionally solved by providing an article of footwear comprising a sole, an open toe section, an instep section having two instep side supports, the instep side supports being connected to the instep part of the sole and otherwise being open, and a heel section. This construction uses a minimum of material to maintain the stability of the athlete's foot.

Alternatively and additionally the objects of the invention are also solved by an article of footwear comprising a sole, an open toe section, an instep section, and a heel section. The heel section comprises two heel side supports and an end heel support, and the two heel side supports and the end heel support are connected at a first end to the heel part of the sole and are connected to each other at the other end.

To improve the stability of the footwear, the article of footwear has two instep side supports being connected to the instep part of the sole and otherwise being open. In this context "being open" means that the upper ends of the instep side supports are not connected together as they would be in conventional prior art footwear.

To hold the article of footwear onto the athlete's foot, the article of footwear further includes an upper instep section which is preferably attached to the instep side supports by means of adjustable ties.

The article of footwear can also be provided with one or more straps attached to a surface of the open toe section. These straps hold the toes into position.

The invention also comprises a method for the manufacture of the shoe having the following steps:
a first step of placing at least one ply of a first material in a toe part and an instep-heel part of a mould;
a second step of placing at least one ply of a second material in a ball part of the mould, wherein the first material and the second material overlap at seams.

a third step of placing at least one ply of a third material in the toe part and the instep-heel part of the mould.

a fourth step of curing the first material and the second material to form the article of footwear.

The first and second materials are overlapped at the seams in order to ensure a strong join between the materials.

In both the first and third step, more than one ply of material can be used in order to strengthen the shoe.

DETAILED DESCRIPTION OF THE INVENTION

Figure 1:
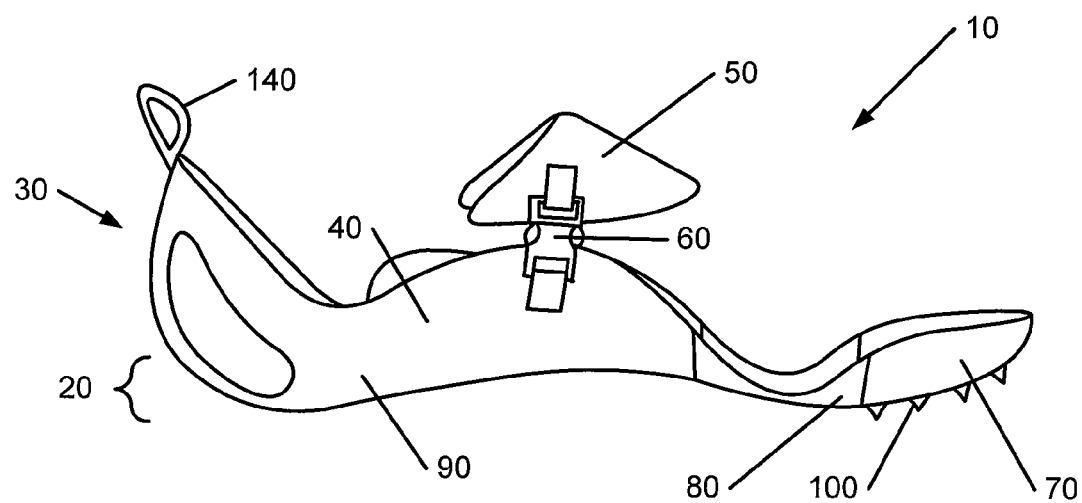
FIG. 1 shows a side view of a first embodiment of an athlete's shoe.

FIG. 1 shows a side view of a first embodiment of an article of footwear 10 according to the invention. The article of footwear 10 is in this embodiment an athlete's shoe, but this is not limiting of the invention. The shoe 10 has a sole 20, a heel 30, instep side supports 40 and an upper instep 50. The upper instep 50 is attached to the instep side supports 40 by means of ties 60. The instep side supports 40 include an upwardly extending instep medial side support located at a medial side of the article of footwear and an upwardly extending instep lateral side support at a lateral side of the article of footwear. The upper 50 is engaged with the instep medial side support and the instep lateral side support.

The sole 20 of the shoe 10 is divided into a toe part 70, a ball part 80 and an instep-heel part 90. The toe part 70 is substantially adjacent to the toes of the athlete's foot and the ball part 80 is substantially adjacent to the ball of the athlete's foot. The instep-heel part 90 of the sole 20 comprises the rest of the sole 20.

It can be seen that the toe part 70 is curved in order to maintain forward momentum of the athlete and to minimise a "slapping" effect onto the ground which results in the loss of energy. The shape of the toe part 70 encourages the athlete to "roll" the foot. For a shoe of UK size 7.5, the radius of curvature is found to be 6.2 cm from the start of the curvature to the point where the curvature falls out.

Spikes 100 can be attached to the underside of the toe part 70 of the sole 20.

The upper instep 50 is located over an instep portion of the instep-heel part 90 and is engaged with the instep-heel part of the sole 20 by an adjustable connection. The upper 50 is located such that a foot-receiving opening for the article of footwear is defined between the upper and the heel portion 30 of the instep-heel part 90. The upper does not extend over the ball part 80, toe part 70, and heel part 30 of the sole 20 such that an entire area of a top surface of the sole forward and aft of the upper 50 is openly exposed. The straps connecting the upper instep 50 to the instep side supports 40 are adjustable by means of the ties 60. In the figure, the ties 60 are shown as cable ties. Other types of attachments could be used, including laces, Velcro fittings, buckles and straps.

Figure 2:
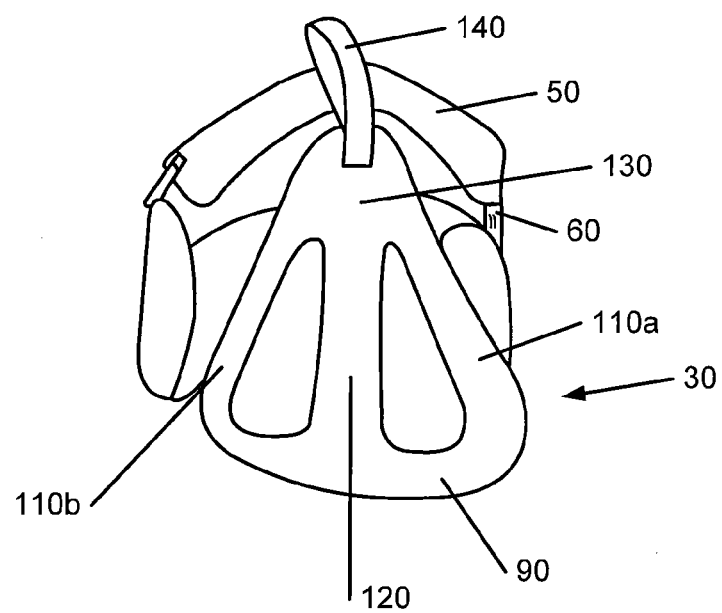
FIG. 2 shows a view from the heel end of the athlete's shoe of FIG. 1.

The heel 30 comprises three parts as can be seen from FIG. 2 which is a view from the heel end of the shoe 10. The heel 30 has two heel side supports 110a and 110b and an end heel support 120. The end heel support 120 and the two heel side supports 110a and 110b are connected at the heel end to the instep-heel part 90 of the sole 20. The end heel support 120 and the two heel side supports 110a and 110b are connected at their common top end 130 together. First and second openings are defined through the heel portion by the two heel side supports respectively with the end heel support. A textile loop 140 is provided at the common top end to aid the athlete in putting on the shoes.

Figure 3:
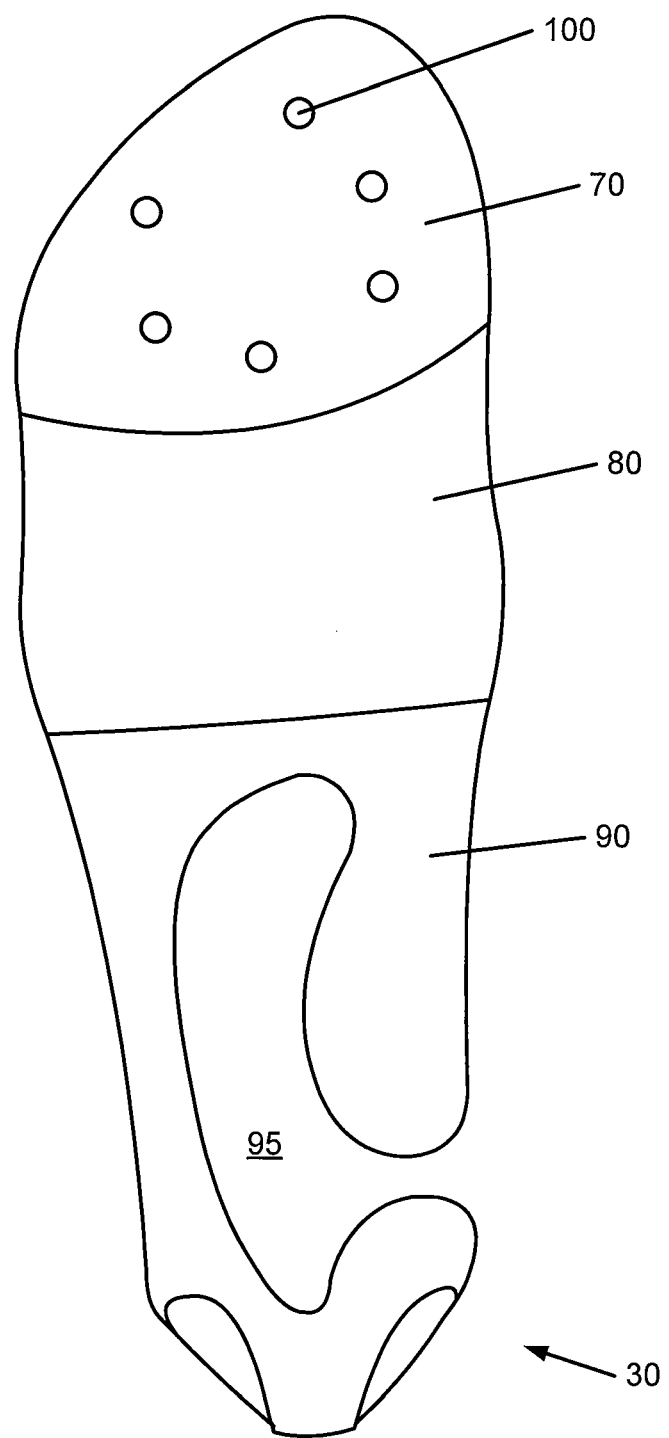
FIG. 3 shows a view from the underside of the athlete's shoe of FIG. 1.

As can be seen from FIG. 3, the instep-heel part 30 of the sole 20 is not completely filled but includes a vacancy 95 over the instep of the foot in which no material is present. This vacancy 95 reduces the weight of the shoe because no material is present. The vacancy is considered a third opening in the sole 20 of the article of footwear. The third opening is defined through an entire thickness of the instep-heel part 90. Additionally, the third opening 95 extends from the heel portion 30 to the instep portion of the instep-heel part and between the first heel side support 110b and the upwardly extending instep medial side support 40 of the instep-heel part located at a medial side of the article of footwear such that the first heel side support and the upwardly extending instep medial side support are separated and spaced apart from each other by the third opening.

The toe part 70 and the instep-heel part 90 are made of a stiff, substantially inflexible material. By stiff, substantially inflexible material is meant a material which shape remains substantially unchanged under the normal forces experienced in athletics. This material is a composite material and in one example comprises carbon fibre sheets. The carbon fibre sheets are made of carbon fibres embedded in a thermoplastic epoxy resin. In the preferred embodiment of the invention, both the toe part 70 and the instep-heel part 90 are made of the same material, but they could be made of different materials.

The carbon fibre sheets used were made by Advanced Composites and had a two by two weave and weighed 200 g/m$^2$. The carbon fibre is a T300 fibre and the carbon fibre sheets.

The heel 30 and the instep side supports 40 are preferably also made of the same material. Indeed they are usually formed integrally with the instep-heel part 90 of the sole 20.

The ball part 80 of the sole 20 is made of a flexible material. This material is flexible at the ball of the athlete's foot. In use, the material flexes at an axis within the material. This is particularly noticeable when the athlete is at the starting blocks. The flexible material is preferably made from a woven aramide fibre sheet comprising aramide fibres, such as Kevlar®, embedded within a thermoplastic epoxy resin.

The flexible material used was a two by two weave of Kevlar fibres made by Advanced Composites and weighing 135 g/m$^2$.

Manufacture of the shoe 10 is carried out in the following manner. Six spikes are cleaned and positioned in a toe part of the mould. A first ply of the carbon fibre sheet was placed in the mould in the toe part of the mould and the instep-heel part of the mold. Firs reinforcements of 10 mm diameter carbon fibre sheets were placed over the spikes. A second ply of the carbon fibre sheet was placed over the first play and second reinforcements of 10 mm diameter carbon fibre sheets were placed over the spikes. A ply of the flexible material was then placed in the ball part of the mould. The flexible material overlapped the second play of the carbon fibre sheet by 10 mm in both the seams with the toe part of the shoe and the instep-heel part of the shoe. A third ply was then placed in the toe part of the mould and the instep-heel part of the mould so that a 10 mm overlap with the ply of the flexible material was achieved at both seams. Third reinforcements of 10 mm diameter of the carbon fibre sheets were used at the spikes. Finally a fourth ply of carbon fibre sheet was laid in the toe part and the instep-heel part of the mould over the third ply of carbon fibre sheet.

The vacancy 95 in the sole 20 and the holes in the heel 30 are made by trimming the material with a diamond-tipped tool.

The mould was closed by vacuum and baked at 135° C. at 90 psi to cure the shoe. The time taken to reach 135° C. is around one hour and the total time, including curing, to produce the finished shoe is 3.5 hours (without trimming).

The shoe 10 made from four ply composite material would weigh between 40 and 43 g. Depending on the size of the shoe 10, these weights will vary slightly.

In another embodiment of the invention, a three ply composite material is used (i.e. three plies of aramide fibre sheet and one layer of carbon fibre sheet). The shoe weighs then about 25-27 g.

Figure 4:
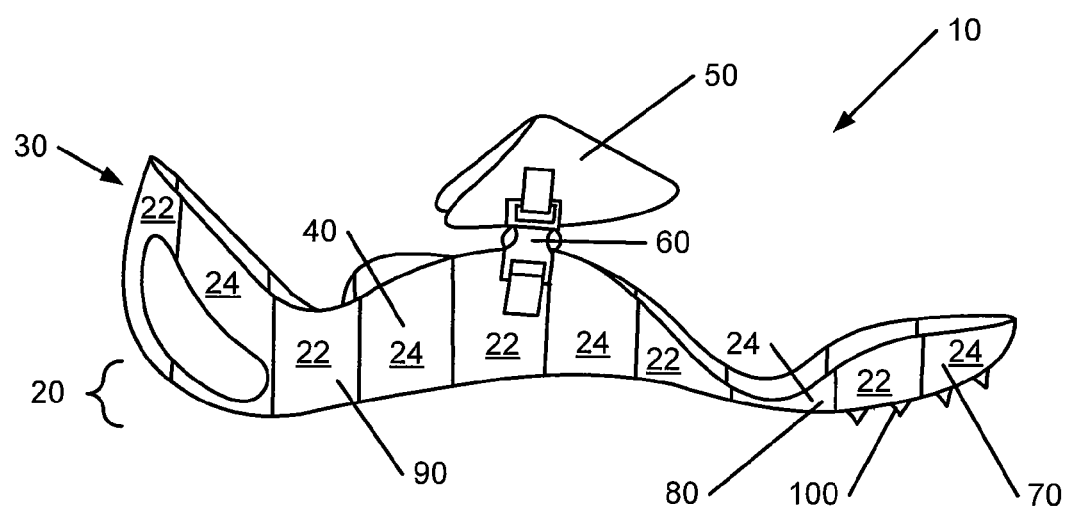
FIG. 4 shows a side view of a second embodiment of an athlete's shoe.
Figure 5:
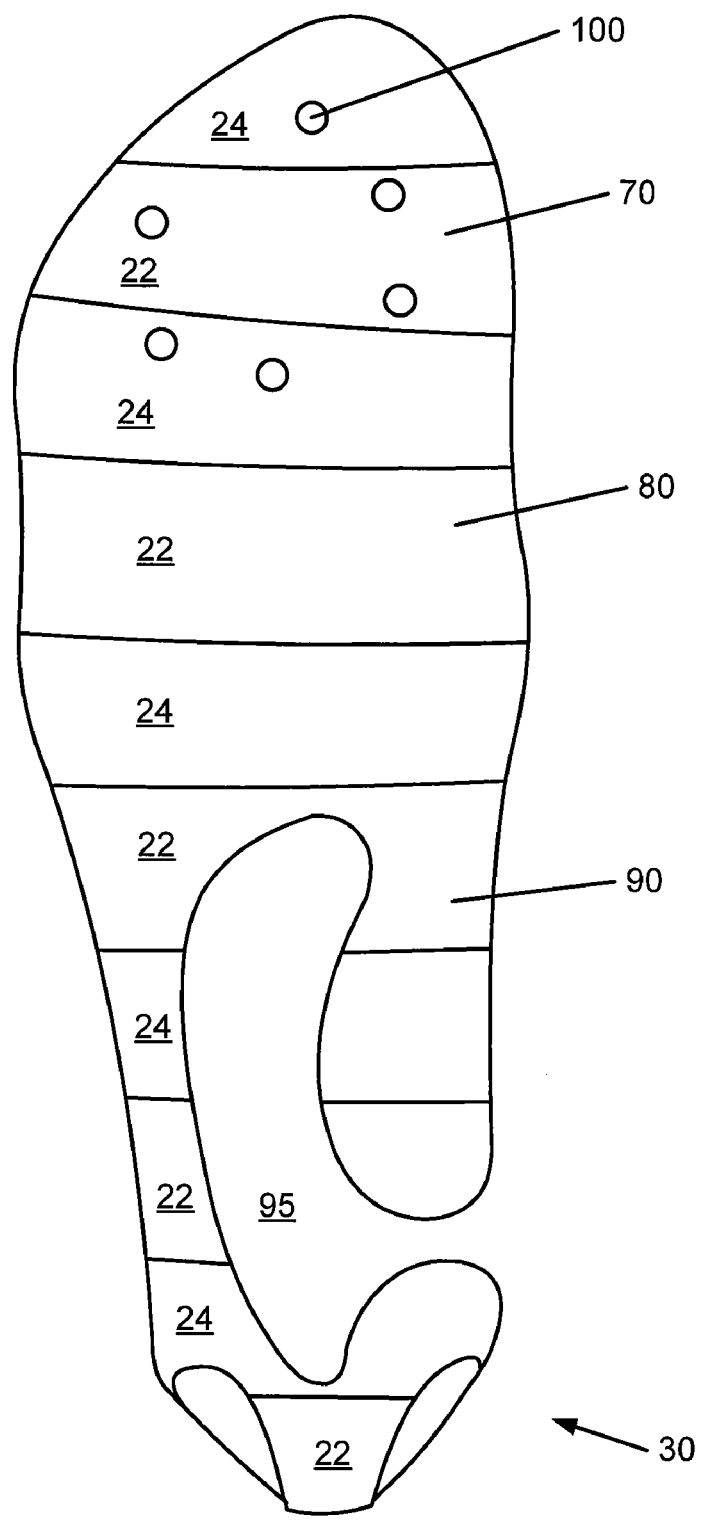
FIG. 5 shows a view from the underside of the athlete's shoe of FIG. 4.

A second embodiment of the article of footwear 10 is shown in FIGS. 4 and 5. The second embodiment is similar to the first embodiment as depicted in FIGS. 1-3 and identical reference numbers are used for identical parts in the Figures. The shoe 10 of the second embodiment is, however, divided into a plurality of sections 22 and 24. Each of the sections 22 and 24 is approximately 2-3 cm in width. First sections 22 are made of the stiff, substantially inflexible material. Second sections 24 are made of the flexible material. In the embodiment of FIG. 5, five first sections 22 and five second sections 24 are shown. This is merely exemplary and not limiting of the invention.

Figure 6:
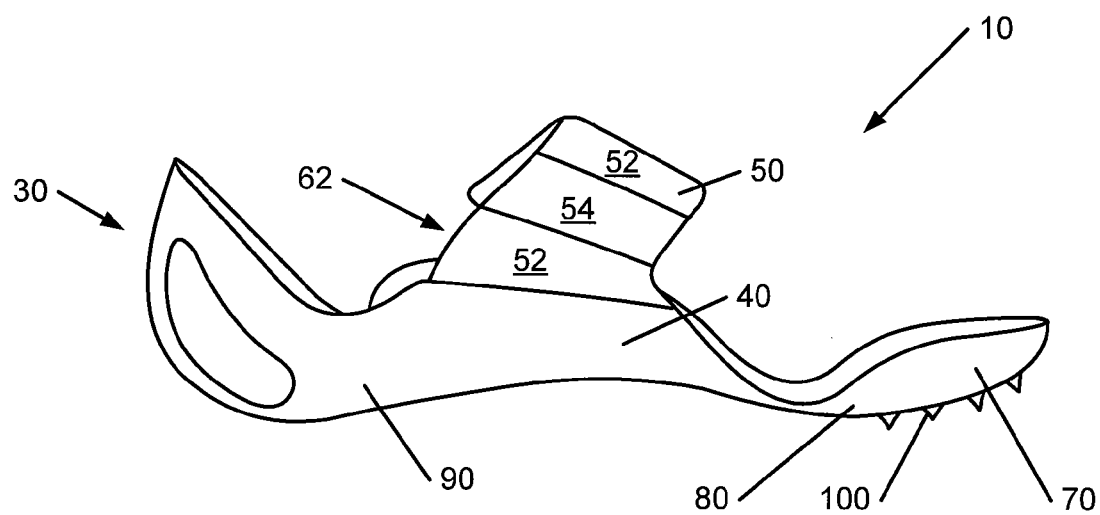
FIG. 6 shows a side view of a third embodiment of the athlete's shoe.
Figure 7:
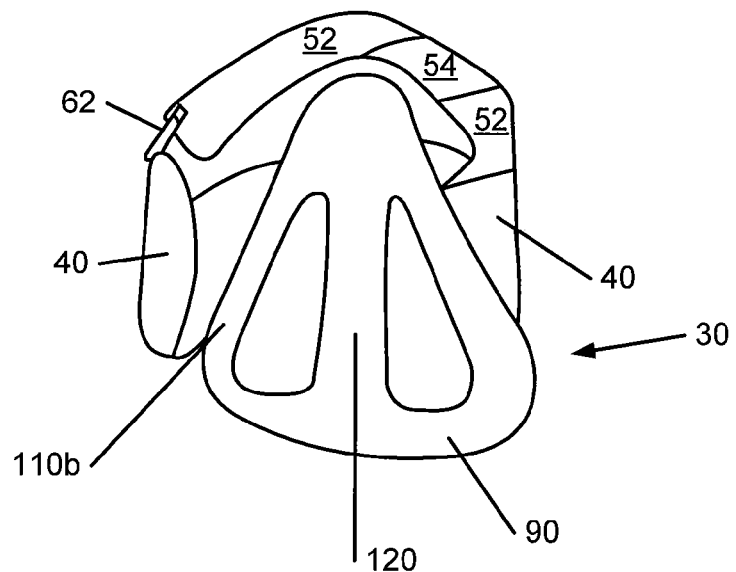
FIG. 7 shows a view from the heel end of the athlete's shoe of FIG. 6.

A third embodiment of the article of footwear 10 is shown in FIGS. 6 and 7. In this embodiment of the invention the upper instep 50 is connected on one side to the instep side support 40. On the opposite side a single tie 62 connects the upper instep 50 to the instep side support 40. In this example the upper instep 50 is made of alternate sections 52 and 54. Alternate ones of the sections 52 and 54 are made of the flexible material and alternate ones of the sections 52 and 54 are made of the stiff material.

The invention claimed is:

1. An article of footwear, comprising:
   a sole having a toe part, a ball part extending from the toe part, and an instep-heel part extending from the ball part, wherein:
   the toe part is made of a substantially inflexible material and includes a plurality of spikes extending from a bottom surface thereof,
   the ball part is made of a flexible material, and
   the instep-heel part is made of a substantially inflexible material, wherein the instep-heel part includes a heel portion including a first heel side support, a second heel side support, and an end heel support at a rear heel location, wherein a first opening is defined through the heel portion by the first heel side support and the end heel support and a second opening is defined through the heel portion by the second heel side support and the end heel support;
   an upper located over an instep portion of the instep-heel part and engaged with the instep-heel part of the sole by an adjustable connection, wherein the upper is located such that a foot-receiving opening for the article of footwear is defined between the upper and the heel portion of the instep-heel part, and wherein the upper does not extend over the ball part, toe part, and heel part of the sole such that an entire area of a top surface of the sole forward and aft of the upper is openly exposed; and
   the instep-heel part including a third opening defined through an entire thickness of the instep-heel part, wherein the third opening extends from the heel portion to the instep portion of the instep-heel part and wherein the third opening extends between the first heel side support and an upwardly extending instep medial side support of the instep-heel part located at a medial side of the article of footwear such that the first heel side support and the upwardly extending instep medial side support are separated and spaced apart from each other by the third opening.

2. The article of footwear according to claim 1, wherein the toe part is made of a composite material of carbon fiber in a thermoplastic resin.

3. The article of footwear according to claim 2, wherein the instep-heel part is made of the composite material of carbon fiber in the thermoplastic resin.

4. The article of footwear according to claim 3, wherein the ball part is made of a composite material of aramid fiber in a thermoplastic resin.

5. The article of footwear of claim 1, wherein the upper is engaged with the instep portion of the instep-heel part by an adjustable tie.

6. The article of footwear of claim 1, wherein the article of footwear is an athletic shoe.

7. The article of footwear according to claim 1, wherein the toe part has an upward curve in a direction from the ball part toward a front end of the toe part.

8. The article of footwear according to claim 1, wherein the adjustable connection includes at least one member selected from the group consisting of: a cable tie, a lace, a hook-and-loop type fastener, and a buckle and strap assembly.

9. The article of footwear according to claim 1, wherein the instep-heel part includes an upwardly extending instep lateral side support at a lateral side of the article of footwear, and wherein the upper is engaged with the instep medial side support and the instep lateral side support.

10. The article of footwear according to claim 9, wherein the upper is made from sections of a first material and a second material arranged in an alternating manner, wherein the first material is a flexible material and the second material is a substantially inflexible material.

11. An article of footwear, consisting essentially of:
    a sole having a toe part, a ball part extending from the toe part, and an instep-heel part extending from the ball part, wherein:
    the sole is comprised of sections of a flexible material and a substantially inflexible material arranged in an alternating manner, the toe part includes a plurality of spikes extending from a bottom surface thereof, and
    the instep-heel part includes a heel portion having a first heel side support, a second heel side support, and an end heel support at a rear heel location, wherein a first opening is defined through the heel portion by the first heel side support and the end heel support and a second opening is defined through the heel portion by the second heel side support and the end heel support;
    an upper located over an instep portion of the instep-heel part and engaged with the instep-heel part of the sole by an adjustable connection, wherein the upper is located such that a foot-receiving opening for the article of footwear is defined between the upper and the heel portion of the instep-heel part, and wherein the upper does not extend over the ball part, toe part, and heel part of the sole such that an entire area of a top surface of the sole forward and aft of the upper is openly exposed; and the instep-heel part including a third opening defined through an entire thickness of the instep-heel part, wherein the third opening extends from the heel portion to the instep portion of the instep-heel part and wherein the third opening extends between the first heel side support and an upwardly extending instep medial side support of the instep-heel part located at a medial side of the article of footwear such that the first heel side support and the upwardly extending instep medial side support are separated and spaced apart from each other by the third opening.

12. The article of footwear according to claim 11, wherein the toe part is made of a composite material of carbon fiber in a thermoplastic resin.

13. The article of footwear according to claim 12, wherein the instep-heel part is made of the composite material of carbon fiber in the thermoplastic resin.

14. The article of footwear according to claim 13, wherein the ball part is made of a composite material of aramid fiber in a thermoplastic resin.

15. The article of footwear of claim 11, wherein the upper is engaged with the instep portion of the instep-heel part by an adjustable tie.

16. The article of footwear of claim 11, wherein the article of footwear is an athletic shoe.

17. The article of footwear according to claim 11, wherein the toe part has an upward curve in a direction from the ball part toward a front end of the toe part.

18. The article of footwear according to claim 11, wherein the adjustable connection includes at least one member selected from the group consisting of: a cable tie, a lace, a hook-and-loop type fastener, and a buckle and strap assembly.

19. The article of footwear according to claim 11, wherein the instep-heel part includes an upwardly extending instep lateral side support at a lateral side of the article of footwear.

20. The article of footwear according to claim 19, wherein a first end of the upper extends directly from the instep lateral side support and a second end of the upper engages the instep medial side support by the adjustable connection.

21. The article of footwear according to claim 20, wherein the upper is made from sections of a first material and a second material arranged in an alternating manner, wherein the first material is a flexible material and the second material is a substantially inflexible material.

22. The article of footwear according to claim 11, wherein the sole is made from plural sections of the flexible material and plural sections of the substantially inflexible material arranged in an alternating manner.

* * * * *